United States Patent Office 3,466,768
Patented Sept. 16, 1969

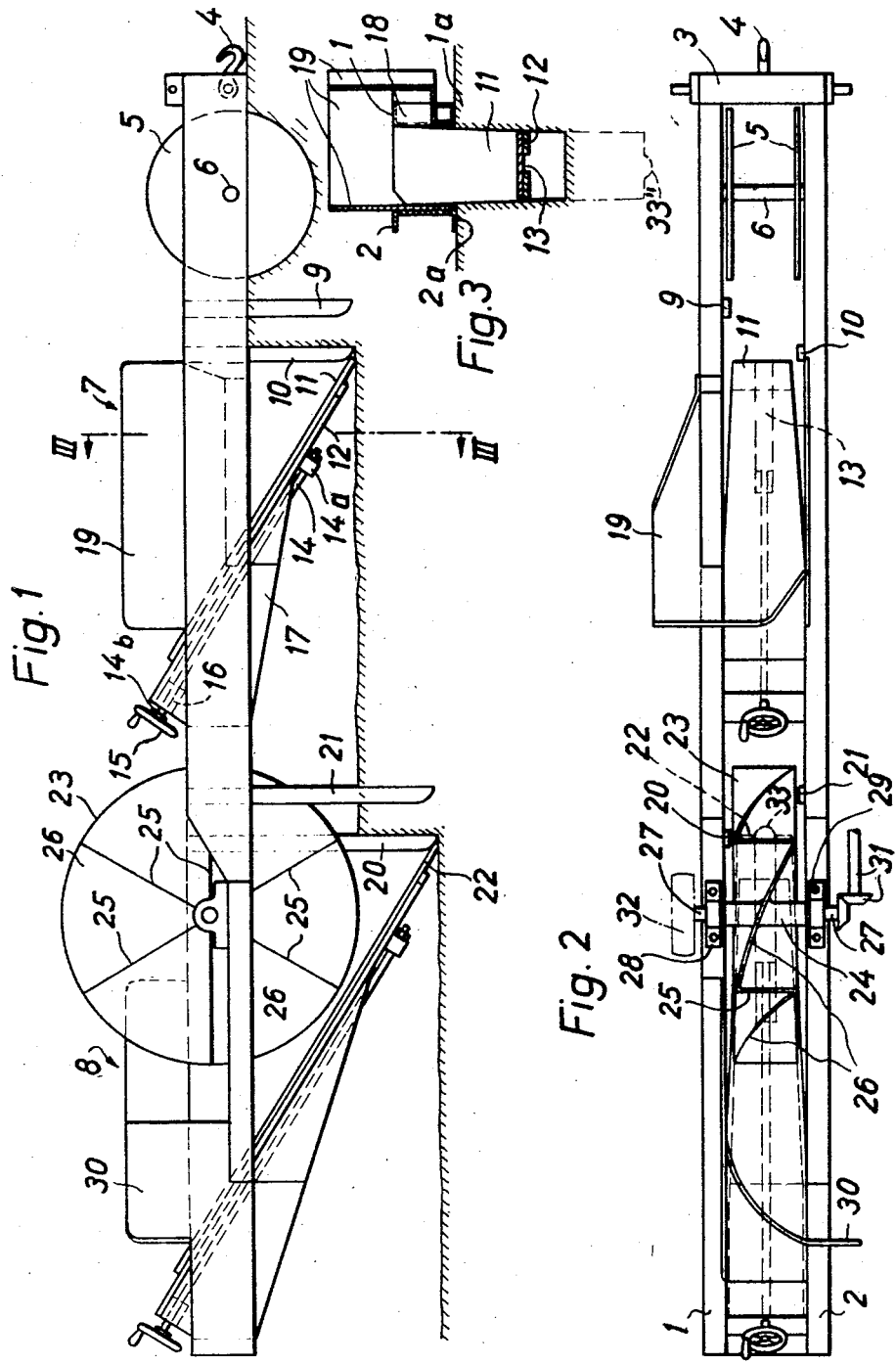

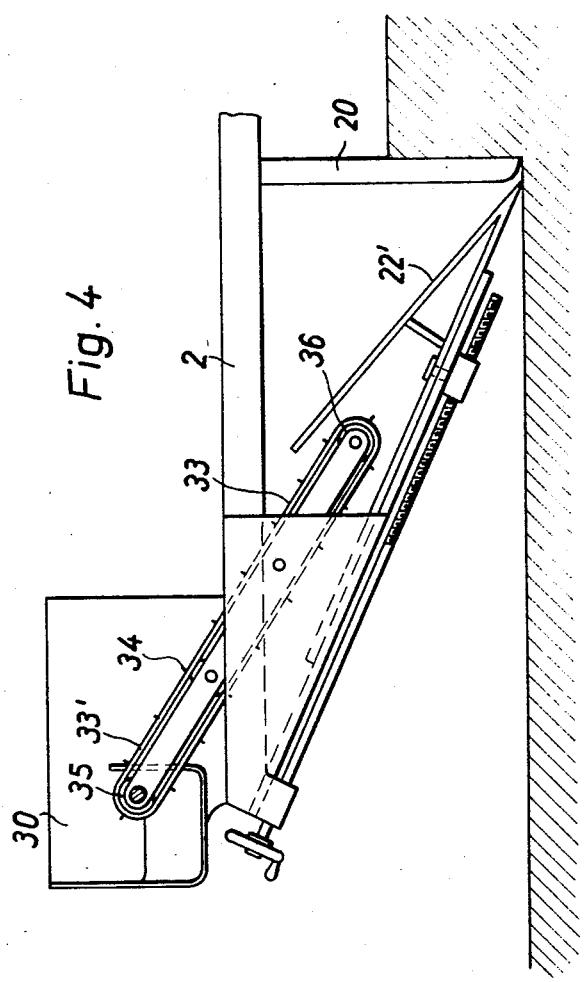

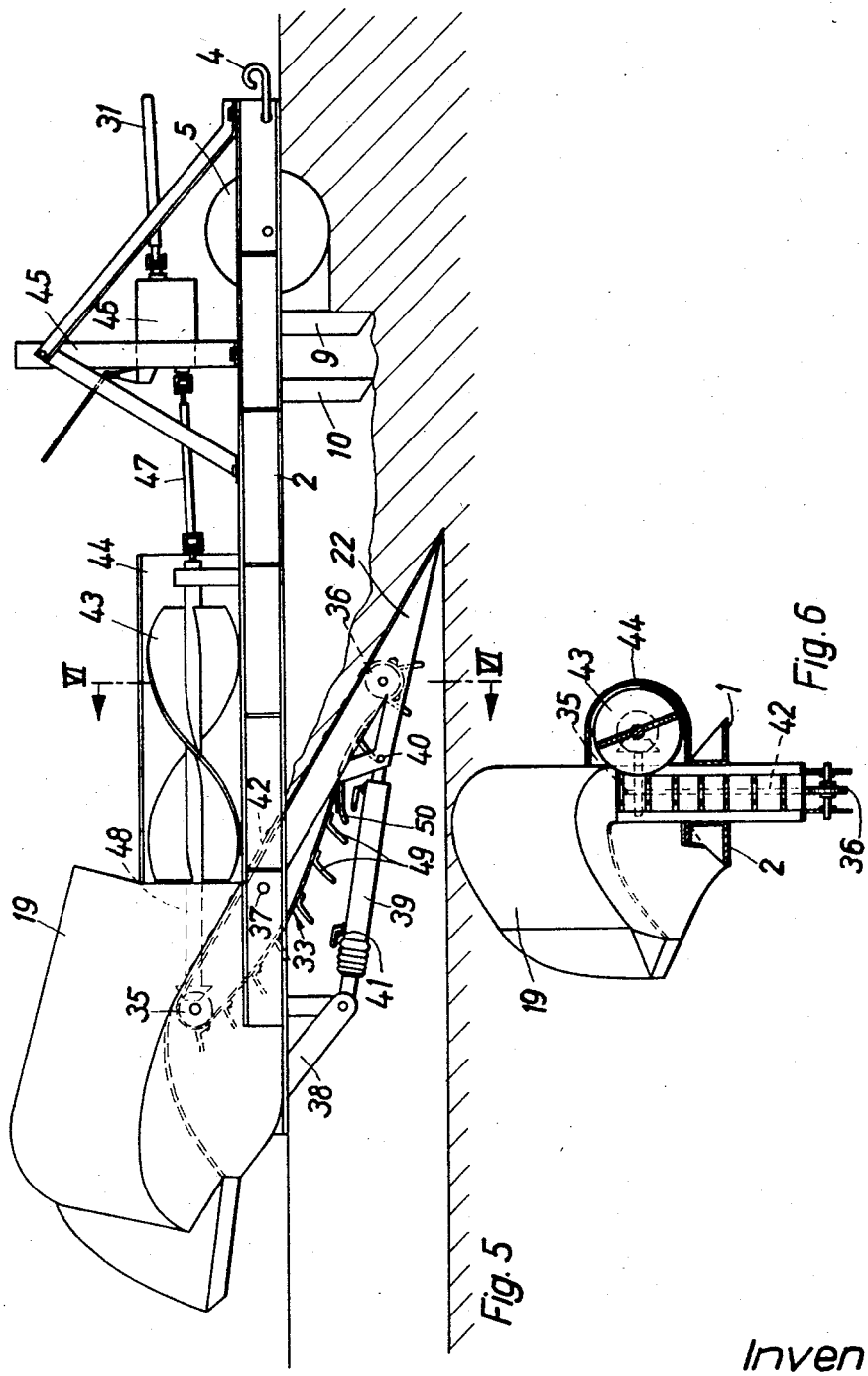

3,466,768
TRENCHING MACHINE HAVING EARTHWORK-
ING MEMBERS EXTENDING TO PROGRESSIVE-
LY GREATER DEPTHS
Henri Guinoiseau, Contigne, France, assignor to Societe
Francaise de Construction de Bennes Automatiques
Benoto, Paris, France
Filed Nov. 16, 1966, Ser. No. 594,778
Claims priority, application France, Nov. 16, 1965,
38,642; Oct. 14, 1966, 80,082
Int. Cl. E02f 5/02
U.S. Cl. 37—101       7 Claims

ABSTRACT OF THE DISCLOSURE

A trenching machine has a pair of spaced parallel lontudinally extending beams on which it slides on the ground. Earthworking members depend from the beams to progressively greater depths along the length of the beams. The first of these are tilling discs. Then come diggers that may have endless conveyors on their upper surfaces or a superposed rotary conveyor. A lateral diverter sends dirt from the digger to one side, and to opposite sides if there are two diverters for two diggers. A longitudinally extending screw conveyor keep dirt from spilling to the wrong side.

The present invention relates to a machine adapted to dig trenches rapidly, and to dig them straight and deep, to provide irrigation or drainage channels or for other purposes.

As is known, it is becoming more and more necessary, in order to increase the yield of cultivated soils, to drain them when they are too wet or to irrigate them when they are too dry. In either case, the desired result may be obtained by means of drainage conduits for removing excess water or irrigation conduits. In any event, it is necessary to dig the ditches straight and deep, with different slopes, at the bottom of which are disposed the conduits. It is already known to provide similar apparatus for performing related operations, but the known apparatus is extremely powerful and expensive and is adapted to dig ditches in hard and rocky ground, for the purpose of digging large or relatively major trenches for the reception of large pipelines.

The invention has for its object to provide a machine which will be simple and inexpensive in its arrangement and construction, easily drawn by tractors usually available in agricultural operations, and especially conceived to dig quickly, in relatively soft ground, relatively small trenches, in which no more than small conduits are to be disposed.

According to the invention, the machine is comprised by two elongated parallel members, fastened to each other by crosspieces and of which the under face, free from projections, is adapted to slide on the ground and to be pulled therealong by means of draft structure mounted on an end of the said longitudinal members.

According to a first form of the invention, the machine comprises at least two cutting-digging diverting assemblies analogous to a plow, disposed in line between the two longitudinal members with their working depths progressively increasing from one to the other from the forward extremity of the machine which is provided with the draft means.

Each cutting-digging-diverting assembly comprises two substantially vertical cutters, fixed each to one of the longitudinal members at substantially opposed transverse positions, a digger inclined at an angle of about 30° to the horizontal, having at its lower end a width as great as the distance separating the two cutters, and being connected at its upper end with a diverter directed to the side, above one of the longitudinal members.

The working depth of the cutters and diggers is adjustable.

The diverters of the first assemblies adjusted as to working depth in the arable ground are directed to one side of the longitudinal members, while the diverters of subsequent assemblies adjusted to work in the layers of subsoil are directed to the other side of the longitudinal members.

At least one of the assemblies is provided with means promoting the elevation of the dirt, disposed between the longitudinal members, mounted on at least one rotatable transverse shaft and carried by the longitudinal members. This means moves, in operation, in the vicinity of the upper face of the said digger of the said assembly to above the surface of the associated diverter.

On the other hand, it has been determined that the zone of depths ordinarily suitable for the positioning of underground conduits may be obtained with a single digger if the latter can be adjusted as desired and the means for raising the dirt from the lower end to the upper end of the digger can be rendered more effective.

According to a second form of the invention, the machine is provided with a unique cutting-digging-diverting assembly, the digger being pivotally mounted about a horizontal shaft carried by the longitudinal members, such that a drive means is mounted on the one hand on the longitudinal members and on the other hand is connected to the digger, and permits the adjustment of the inclination of the digger.

The means assisting in the elevation of the dirt comprises an endless conveyor, preferably bladed, of which the active run is located substantially in the plane of the upper inclined face of the digger, the beginning of the active ascending run of the said conveyor being spaced a short distance from the cutting end of the digger.

A rotatively driven screw conveyor is dsposed above the upper surface of the longitudinal member located on the side opposite the direction of diversion of the diverter.

The invention will be better understood in the light of the description below of certain embodiments that are disclosed, solely by way of example, from which will appear certain secondary characteristics, as well as the advantages of the invention. The appended drawings will be referred to as follows:

FIG. 1 is a side elevational view of a machine according to the invention.

FIG. 2 is a top plan view of the machine of FIG. 1.

FIG. 3 is a section along the line III—III of FIG. 1.

FIG. 4 is a side elevational view of a modification of the dirt elevating means seen in FIG. 2.

FIG. 5 is a side elevational view of a machine according to a second embodiment of the invention; and FIG. 6 is a cross-sectional view taken on the line VI—VI of FIG. 5.

The illustrated machine for digging trenches comprises two longitudinal members 1 and 2 comprised of U-shaped channels interconnected in spaced parallel relationship by crosspieces (not shown). In use, these channels are disposed back-to-back with their flanges extending in opposite directions and their webs disposed face-to-face. The lower faces 1a and 2a of the assembled longitudinal members present no propections; they are adapted to rest and slide on the surface of the ground.

At one end, which is the forward end, the longitudinal members 1 and 2 are provided with draft apparatus 3 having a hook 4 by which the machine may be pulled by a tractor.

In the given example, there are disposed successively, betwen the longitudinal members 1 and 2, a pair of tilling discs 5, free to rotate about a transverse axle 6, a first cutting-digging-diverting assembly designated by the general reference numeral 7, and a second cutting-digging-diverting assembly designated by the general reference numeral 8.

The first assembly 7 comprises first two vertical cutters 9 and 10 each of which is fixed but is adjustable as to height on and relative to one of the longtiudinal members 1 and 2, and which are displaced a small distance from each other in a longitudinal direction. The assembly 7 comprises next a digger comprised of a digger proper at 11 inclined at about 30° to the horizontal and a reinforcing plate 12 which supports the digger 11 along the greatest part of its length. The plate 12 is indented at 13 (see FIG. 2). The end 14a of a screw 14 is fixed in the indentation 13 with the digger 11; the other end 14b of the screw is provided with an operator 15 and passes through a screw-threaded sleeve 16 fixed to the plate 12. Plate 12 is itself fixedly secured to the longitudinal members 1 and 2, respectively, by vertical gussets 17.

The mounting of the diggers imparts to them a good general rigidity and permits regulation of their working depth by manipulation of the operator 15. It would of course be possible to make numerous variations in this embodiment and to use other modes of adjusting the depth of the diggers. It would also be possible to make the inclination adjustable and to mount the gussets 17 movably relative to the longitudinal members 1 and 2.

Bolts (not shown) serve to fix the digger firmly in the desired position.

A certain distance above the lower surface 1a, the longitudinal member 1 has an opening 18 which extends to its a portion of the length of the digger. In this opening is disupper end (FIG. 3) and extends longitudinally along only a portion of the length of the digger. In this opening is disposed a diverter 19 (best seen in FIG. 2) which begins at the surface of the digger, extends through opening 18 on one side of longitudinal member 1, and ends a little beyond the latter.

The assembly 8 has the same elements as the assembly 7, similarly disposed, with the difference that the cutters 20, 21 and the digger 22 are longer than those of the first assembly and are capable of working at a lower level.

In the given example, there is shown, with the assembly 8, a supplemental mechanism, a rotatable unloading shovel 23, whose employment is not alway necessary because it depends essentially on the working depth and on the nature of the soil.

This rotatable unloading shovel is comprised by a hub 24 provided with radial dividers such as 25 (six in number in the given example) which themselves are interconnected by oblique dividers 26 that extend to the opposite sides of the following divider, as is seen in FIG. 2. This arrangement forms twelve unloading buckets open at their sides.

The hub 24 is secured to a shaft 27 that extends transversely and is supported by pillow blocks 28 and 29 mounted on the upper flanges of the longitudinal members 1 and 2.

The assembled shovel 23 is disposed above the digger 22; during its rotation, the buckets move from the vicinity of the surface of this digger to a position above the diverter 30 which is a part of the assembly 8. It will be noted that, in this case, the diverter 30 is disposed to the side opposite that of the diverter 19 of the assembly 7. There will thus be, in this manner, a separation of the arable dirt, in which the assembly 7 operates, from the subsoil which is penetrated by the assembly 8.

The driving of the rotatable shovel 23 is effectuated by means of a shaft 27 which may be or is drivingly connected by gears and shafts such as 31 to the drive of the tractor that draws the machine by the hook 4, or the shaft 27 may be provided at its ends with a wheel such as 32. In the latter case, the pillow blocks 28, 29 are secured to the longitudinal members 1 and 2 by elastic couplings that maintain the wheel 32 in contact with the ground.

If necessary, depending on the nature of the soil and the depth of working, more than two assemblies such as 7 and 8 can be disposed in line on a single machine and can be provided or not with a rotatable shovel such as 23 or with another means promoting the movement of the dirt along the digger or diggers which operate at the greatest depth.

An apparatus that may be thus used in place of the rotatable shovel 23 is the subject of FIG. 4.

Behind the cutter 20 of FIG. 4 is seen a digger 22' having a V shape of which the point is directed toward the bottom of the trench. This cutter is adjustable as to depth as before. An endless conveyor 33 is disposed in the opening of the V and extends to above the longitudinal member 2. In this region, its upper end 33' is disposed above the diverter 30.

The surface of the endless conveyor 33 is provided with transverse bars 34.

As in the case of FIG. 2, the rotative drive is accomplished by a gear fixed to the upper pulley 35 and driven by the tractor. A chain (not shown) transmits movement to a second gear fixed to the lower pulley 36.

To operate a machine according to the invention, a tractor draws the device by means of the draft structure 3, after the operator has suitably regulated the working depth of the two assemblies, according to the requirements they must fulfill; their results are additive and there is finally obtained a finished trench, shown in FIG. 3. It will be seen that it may be advantageous to give the lower end of the last digger 22 at half-moon shape which forms a small gutter 33" in the bottom of the trench, to aid in positioning a conduit therein. The diggers have lateral inclined sides which guard against the caving in of the walls of the finished trench.

According to a second form (FIGS. 5 and 6), at the region of the upper end of the digger 22, the longitudinal members 1, 2 support a diverter 19 which directs the earth to one side of the machine, as is best seen in FIG. 2.

The digger 22 is mounted between the longitudinal members 1 and 2, on a transverse shaft 37 carried by the latter, about which it may pivot.

At the rear of the digger 22, an inclined frame 38 is secured to the longitudinal members 1, 2, below the lower surfaces thereof that are in contact with the ground. Operating means, for example a hydraulic jack 39, is secured on the one hand to the frame 38 and on the other hand, at 40, to the digger 22. In this manner, the inclination of the digger with respect to the longitudinal members and, as a result, the depth at which its lower end will be disposed are regulable between a lower limit and an upper limit. It is evident that the penetration of the cutters 9 and 10 may also be made regulable, for example with the aid of adjustment screws.

The position shown for the jack 39 is particularly advantageous, because the latter is thus well protected, behind the cutter and under the diverter 19. Its feed is ensured by flexible conduits 41, shown only in part, which are in the hydraulic fluid circuit of the tractor by which the machine is drawn.

In view of the fact that the novel digger may be disposed at such great inclination, corresponding to the maximum working depth, an endless conveyor 33 or blade conveyor is disposed on the digger 22 between an upper gear or pulley 35 and a lower gear or pulley 36. The latter is disposed so that the active run 42, moving from the bottom to the top of the endless conveyor 33, is disposed about in the same plane as the upper inclined face of the digger 22. In addition, the gear or pulley 36 is relatively close to the cutting end of the digger, so that the earth is very rapidly taken and removed by the conveyor 33.

Above the longitudinal member 1, which is opposite the side to which the diverter 19 discharges, is mounted a screw conveyor 43 which is surrounded outside the longitudinal members by a semicylindrical sheet metal envelope 44.

The rotation of the screw conveyor 43 is chosen so that it tends to push toward the digger and toward the diverter the earth which tends to escape past the longitudinal member 1. This screw conveyor is of greatly enhanced efficiency by virtue of its rotation, as compared to a simple sheet metal member secured in the same position.

At the front of the machine, an upright frame 45 rises above the longitudinal members 1, 2 and carries a conventional gear box 46 of which the drive shaft is connected to a shaft 31 driven by the tractor that pulls the machine.

The driven shaft of the gear box is connected by a transmission shaft 47 to the shaft of screw conveyor 43, which is itself coupled by another shaft 48 to a transmission which includes the upper gear of the conveyor 33. It will be seen for example that the blades 49 of the latter are secured at only one of their ends. They may thus hang under the cutter, as seen in FIG. 5, thereby to discharge the dirt that adheres to them. In addition, a scraper blade 50 is fixed transversely under the digger, and the blades 49 slide on blade 50 before reaching the lower gears 36.

Although it is not shown in detail in the drawings, the digger 22 has, when seen head on, a trapezoidal form, narrow at the base, at the bottom of the trench, and larger at the top.

During operation of the machine, the gear box 46 permits easy regulation of the speed of the conveyor 33 as a function of the nature of the soil, of the depth of the trench, and the speed of advance of the tractor, thereby to facilitate removal of dirt under all circumstances.

Having described my invention, I claim:

1. A trenching machine comprising an elongated frame comprised by a pair of elongated parallel members that are spaced apart and fixedly interconnected, the undersides of said elongated members being plain and smooth to support the machine for sliding movement on the ground on said undersides, a plurality of earthworking members secured to and depending from the frame and spaced apart longitudinally of the frame, said earthworking members depending progressively greater distances below the frame in the direction of movement of the frame so as to penetrate the soil at progressively greater depths, at least a rear said earthworking member comprising means to elevate loose dirt so as to leave a trench behind the machine, said rear earthworking member comprising a digger inclined at an angle of about 30° to the horizontal and extending above the frame, a lateral diverter for receiving dirt from the digger above the frame and diverting the dirt to one side of the frame, conveyor means movable relative to the digger for facilitating removal of dirt from the digger, said conveyor means comprising an endless conveyor having its upper run substantially coplanar with the upper surface of the digger, means mounting said digger for vertical swinging movement on and relative to and between said elongated parallel members, and means disposed below and behind said digger and acting between said digger and said frame selectively to adjust the inclination of said digger relative to said frame.

2. A trenching machine as claimed in claim 1, said adjusting means comprising a fluid motor pivotally interconnected at its forward end with said digger behind and below said endless conveyor and pivotally connected at its rear end with said frame below and behind said endless conveyor and below said elongated parallel members.

3. A trenching machine as claimed in claim 2, and a screw conveyor extending lengthwise of the frame on the side of the frame opposite the side to which lateral diverter diverts dirt, and a semicylindrical sheet metal envelope which closes the upper and lower sides of said screw conveyor and the side of said screw conveyor remote from the frame but which is open laterally on the same side as the frame for catching and returning dirt that tends to escape to said opposite side of the machine.

4. A trenching machine as claimed in claim 1, and a screw conveyor extending lengthwise of the frame on the side of the frame opposite the side to which said lateral diverter diverts dirt, and a semicylindrical sheet metal envelope which closes the upper and lower sides of said screw conveyor and the side of said screw conveyor remote from the frame but which is open laterally on the same side as the frame for catching and returning dirt that tends to escape to said opposite side of the machine.

5. A trenching machine as claimed in claim 4, and gear means interconnecting the rear end of said screw conveyor and the upper end of said endless conveyor to drive said endless conveyor from said screw conveyor, and drive means for driving the forward end of said screw conveyor.

6. A trenching machine as claimed in claim 1, said endless conveyor having a plurality of transverse blades thereon, and a scraper secured to said digger and engageable with said blades on the underside of said endless conveyor to clean said blades.

7. A trenching machine comprising an elongated frame comprised by a pair of elongated parallel members that are spaced apart and fixedly interconnected, the undersides of said elongated members being plain and smooth to support the machine for sliding movement on the ground on said undersides, a plurality of earthworking members secured to and depending from the frame and spaced apart longitudinally of the frame, said earthworking members depending progressively greater distances below the frame in the direction of movement of the frame so as to penetrate the soil at progressively greater depths, at least a rear said earthworking member comprising means to elevate loose dirt so as to leave a trench behind the machine, said rear earthworking member comprising a digger inclined at an angle of about 30° to the horizontal and extending above the frame, a lateral diverter for receiving dirt from the digger above the frame and diverting the dirt to one side of the frame, conveyor means movable relative to the digger for facilitating removal of dirt from the digger, said conveyor means comprising an endless conveyor having its upper run substantially coplanar with the upper surface of the digger, said endless conveyor having a plurality of transverse blades thereon, and a scraper secured to said digger and engageable with said blades on the underside of said endless conveyor to clean said blades, means mounting said digger for vertical swinging movement on and relative to and between said elongated parallel members, means disposed below and behind said digger and acting between said digger and said frame selectively to adjust the inclination of said digger relative to said frame, said adjusting means comprising a fluid motor pivotally interconnected at its forward end with said digger behind and below said endless conveyor and pivotally connected at its rear end with said frame below and behind said endless conveyor and below said elongated parallel members, a screw conveyor extending lengthwise of the frame on the side of the frame opposite the side to which said lateral diverter diverts dirt, a semicylindrical sheet metal envelope which closes the upper and lower sides of said screw conveyor and the side of said screw conveyor remote from the frame but which is open laterally on the same side as the frame for catching and returning dirt that tends to escape to said opposite side of the machine, gear means interconnecting the rear end of said screw conveyor and the upper end of said endless conveyor to drive said endless conveyor from said screw conveyor, and drive means for driving the forward end of said screw conveyor.

References Cited

UNITED STATES PATENTS

| | | | |
|---|---|---|---|
| 217,073 | 7/1879 | Custer | 37—101 |
| 311,668 | 2/1885 | Murray et al. | 37—98 |
| 881,942 | 3/1908 | Nicholson | 37—102 |
| 885,306 | 4/1908 | Westenhaver et al. | 37—101 |
| 1,065,457 | 6/1913 | Lutz | 37—101 |
| 2,544,815 | 3/1951 | Weaver | 37—98 |
| 2,986,385 | 5/1961 | Densmore. | |

FOREIGN PATENTS

| | | |
|---|---|---|
| 25,603 | 3/1915 | Norway. |
| 377,954 | 6/1923 | Germany. |
| 880,120 | 6/1953 | Germany. |

ROBERT E. PULFREY, Primary Examiner

CLIFFORD D. CROWDER, Assistant Examiner